June 19, 1956
J. A. TROENDLE
2,751,144
APPARATUS FOR COMPRESSING GASES
Filed Nov. 17, 1951
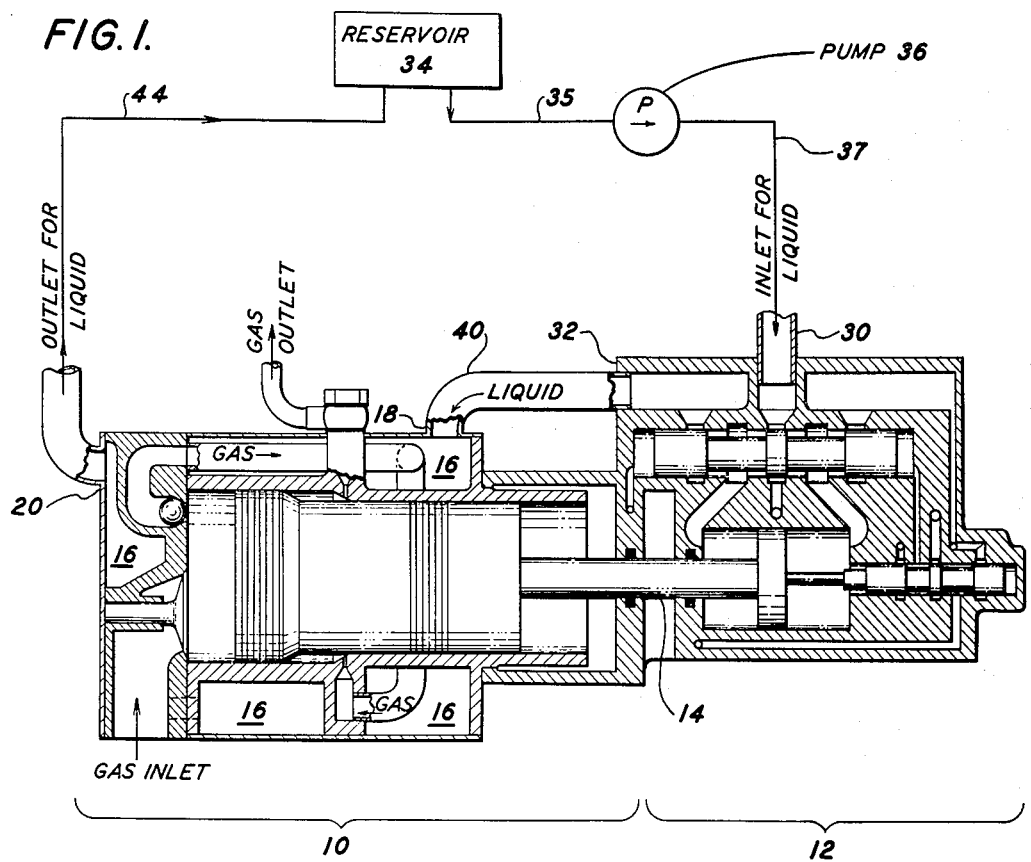
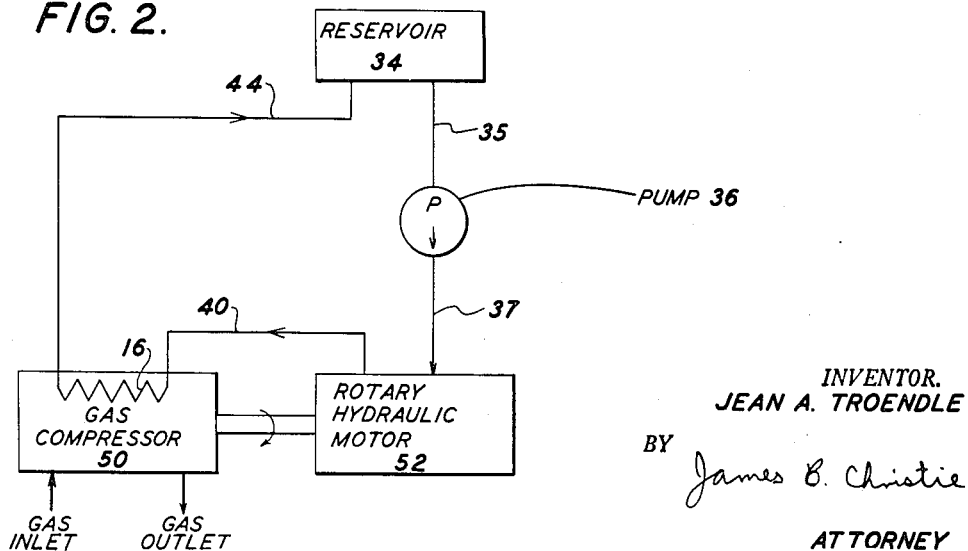
INVENTOR.
JEAN A. TROENDLE
BY James B. Christie
ATTORNEY United States Patent Office
2,751,144
Patented June 19, 1956

2,751,144

APPARATUS FOR COMPRESSING GASES

Jean A. Troendle, Hollywood, Calif.

Application November 17, 1951, Serial No. 256,883

2 Claims. (Cl. 230—52)

This invention relates to apparatus for compressing gases and particularly to an improved cooling system for such apparatus.

The compression og gases in a compressor causes heat to be generated in the compressor unit, and some arrangement should be provided to dissipate the heat and thus prevent damage to the equipment. Ordinarily the heat generated by a compressor is dissipated by circulating water through suitable passageways in its housing or by providing metallic fins on the housing so as to permit increased air cooling.

Such cooling arrangements are not suitable for use in compressors which are employed in aircraft at high altitudes because water cooling systems are ordinarily too heavy, and air cooled compressors overheat at high altitudes because the air is too rarefied to adequately cool the compressor.

These difficulties are overcome in the apparatus of the present invention by providing a compressor which is driven by a hydraulic motor, and by circulating the liquid for the hydraulic motor through the housing of the compressor so as to dissilpate the heat generated in the compressor. The apparatus is particularly suitable for use in aircraft because it is of light weight and because it will function at high altitudes. Also, ordinarily a reservoir and a pump for providing liquid for a hydraulic system are already available in the aircraft.

The invention is explained with reference to the drawings, in which:

Fig. 1 shows the apparatus of the present invention wherein the compressor is driven by a reciprocating hydraulic motor; and Fig. 2 is a schematic showing of an alternative embodiment of the invention wherein the compressor is driven by a rotary hydraulic motor.

Referring to Fig. 1, a compressor unit 10 is driven by a reciprocating hydraulic motor 12 by means of a shaft 14 which interconnects the two units. The compressor unit and the hydraulic motor may be various conventional types and will not be described in detail herein.

The compressor unit 10 is provided with passageways 16 in the housing which surrounds the compression chambers so that a liquid may be circulated through the housing in order to cool the compressor unit. The passageways 16 communicate with an inlet 18 and an outlet 20 which are employed to couple the passageways to an external system for circulating a liquid through the passageways and dissipating the heat which is absorbed by the liquid.

The hydraulic motor 12 has an inlet 30 and an outlet 32 for the liquid which actuates the motor. A reservoir 34 is provided for the liquid, and the liquid is transmitted to the motor through lines 35 and 37 by means of a pump 36 which causes the liquid at the inlet 30 to be under suitable pressure for operating the motor.

A line 40 interconnects the liquid outlet 32 of the motor with the inlet 18 of the liquid cooling system of the compressor so that the liquid which flows through the motor is also caused to flow through the compressor unit.

The outlet 20 for the compressor unit is connected with the reservoir 34 by means of a line 44, so that the liquid which is transmitted through the motor and the compressor unit is returned to the reservoir.

Preferably, the lines 35, 37 and 44 and the reservoir 34 are composed of materials which are good conductors of heat, such as aluminum or copper, and the lines should be of sufficient length to dissipate the heat generated by the compressor unit. The outer surfaces of the lines 35, 37 and 44 and the reservoir 34 are exposed to the atmosphere so as to dissipate the heat which is generated by the compression unit.

In operation, the liquid is pumped from the reservoir 34 by means of the pump 36, and it is forced through the motor 12 and the passageways in the housing of the compressor unit 10 and then through the line 44 back to the reservoir 34. The liquid absorbs heat which is generated in the compressor unit, and most of the heat of the liquid is dissipated as the liquid flows through the line 44 and the reservoir 34, so that the temperature of the liquid which flows through the hydraulic motor is maintained within safe operating limits.

The cooling system of my invention is not limited to use with the specific compressor and motor arrangement shown in Fig. 1, and it may be employed in virtually any liquid cooled compressor apparatus which is driven by a hydraulic motor.

Fig. 2 is a schematic drawing showing the cooling arrangement of Fig. 1 employed in conjunction with a compressor 50 which is driven by a rotary hydraulic motor 52.

I claim:

1. Apparatus for compressing gases comprising a compressor unit having inlet and outlet ports for admitting and discharging gas which is compressed by the compressor unit, a liquid cooling system disposed in heat exchange relationship with the compressor unit and having inlet and outlet ports which are independent of the ports for admitting and discharging gas which is compressed by the compressor unit, a hydraulic motor connected to and driving the compressor unit and having inlet and outlet ports for receiving and discharging liquid, a conduit connecting the liquid outlet port of said motor with the inlet of the liquid cooling system of the compressor to provide a liquid for the cooling system for the compressor, with the cooling system being isolated from the ports for admitting and discharging gas for the compressor unit, liquid pressure means including a reservoir, a conduit coupling the reservoir to the liquid inlet port for the motor for providing liquid under pressure to the motor, and liquid conduit means coupling the outlet of the liquid cooling system for the compressor unit to the liquid pressure means, with the reservoir and the conduits which couple it to the motor and the compressor having the outer surfaces thereof exposed to the atmosphere and serving to dissipate most of the heat which is generated by the compressor.

2. Apparatus for compressing gases comprising a compressor unit having inlet and outlet ports for admitting and discharging gas which is compressed by the compressor unit, a liquid cooling system disposed in heat exchange relationship with the compressor unit and having inlet and outlet ports which are independent of the ports for admitting and discharging gas which is compressed by the compressor unit, a hydraulic motor connected to and driving the compressor unit and having inlet and outlet ports for receiving and discharging liquid, a conduit connecting the liquid outlet port of said motor with the inlet of the liquid cooling system of the compressor to provide a liquid for the cooling system for the compressor, with the cooling system being isolated from the ports for admitting and discharging gas for the compressor unit, a reservoir for liquid, a pump, conduits connecting the pump with the reservoir and the liquid inlet port for the motor for transmitting liquid under pressure to the motor, and an external conduit connecting the outlet port of the liquid cooling system of the compressor to the reservoir, with the reservoir and the conduits which couple it to the motor and the compressor having the outer surfaces thereof exposed to the atmosphere and serving to dissipate most of the heat which is generated by the compressor.

References Cited in the file of this patent

UNITED STATES PATENTS

| | | |
|---|---|---|
| 728,413 | Reynolds | May 19, 1903 |
| 1,488,171 | Savidge | Mar. 25, 1924 |
| 2,033,210 | Tennant et al. | Mar. 10, 1936 |
| 2,092,717 | Jodry | Sept. 7, 1937 |

FOREIGN PATENTS

| | | |
|---|---|---|
| 810,898 | Germany | Aug. 13, 1951 |